US012801285B2

(12) United States Patent
Weinberg et al.

(10) Patent No.: US 12,801,285 B2
(45) Date of Patent: Nov. 17, 2026

(54) MULTI-MEMORY PLANE COMMANDS

(71) Applicant: Micron Technology, Inc., Boise, ID (US)

(72) Inventors: Yoav Weinberg, Thornhill (CA); Luigi Pilolli, L'Aquila (IT); Ali Feiz Zarrin Ghalam, Sunnyvale, CA (US); Leonid Minz, Beer Sheva (IL)

(73) Assignee: Micron Technology, Inc., Boise, ID (US)

( * ) Notice: Subject to any disclaimer, the term of this patent is extended or adjusted under 35 U.S.C. 154(b) by 124 days.

(21) Appl. No.: 18/949,061

(22) Filed: Nov. 15, 2024

(65) Prior Publication Data

US 2025/0173064 A1 May 29, 2025

Related U.S. Application Data

(60) Provisional application No. 63/603,991, filed on Nov. 29, 2023.

(51) Int. Cl.
*G06F 3/06* (2006.01)

(52) U.S. Cl.
CPC .......... *G06F 3/0616* (2013.01); *G06F 3/0659* (2013.01); *G06F 3/0679* (2013.01)

(58) Field of Classification Search
CPC .... G06F 3/0616; G06F 3/0659; G06F 3/0679; G06F 3/061; G06F 3/0611; G06F 3/0658; G06F 3/0683
See application file for complete search history.

(56) References Cited

U.S. PATENT DOCUMENTS 10,445,229 B1 * 10/2019 Kuzmin .............. G06F 11/1068
2012/0166711 A1 * 6/2012 Matsuyama ............ G06F 11/10 711/E12.008
2013/0015578 A1 * 1/2013 Thacker ................ H10W 90/00 257/738
2016/0011779 A1 * 1/2016 Lee ........................ G11C 16/08 711/103
2023/0280929 A1 * 9/2023 Lu ......................... G06F 3/0655

* cited by examiner

*Primary Examiner* — Hiep T Nguyen
(74) *Attorney, Agent, or Firm* — Brooks, Cameron & Huebsch, PLLC

(57) ABSTRACT

A method includes sending, by a controller, a command to perform an operation on a plurality of memory planes of a memory device and performing the operation in response to the command on the plurality of memory planes in absence of sending additional commands.

19 Claims, 6 Drawing Sheets

MULTI-MEMORY PLANE COMMANDS

PRIORITY INFORMATION

This application claims the benefit of U.S. Provisional Application No. 63/603,991, filed on Nov. 29, 2023, the contents of which are incorporated herein by reference.

TECHNICAL FIELD

Embodiments of the disclosure relate generally to memory sub-systems, and more specifically, relate to multi-memory plane commands.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
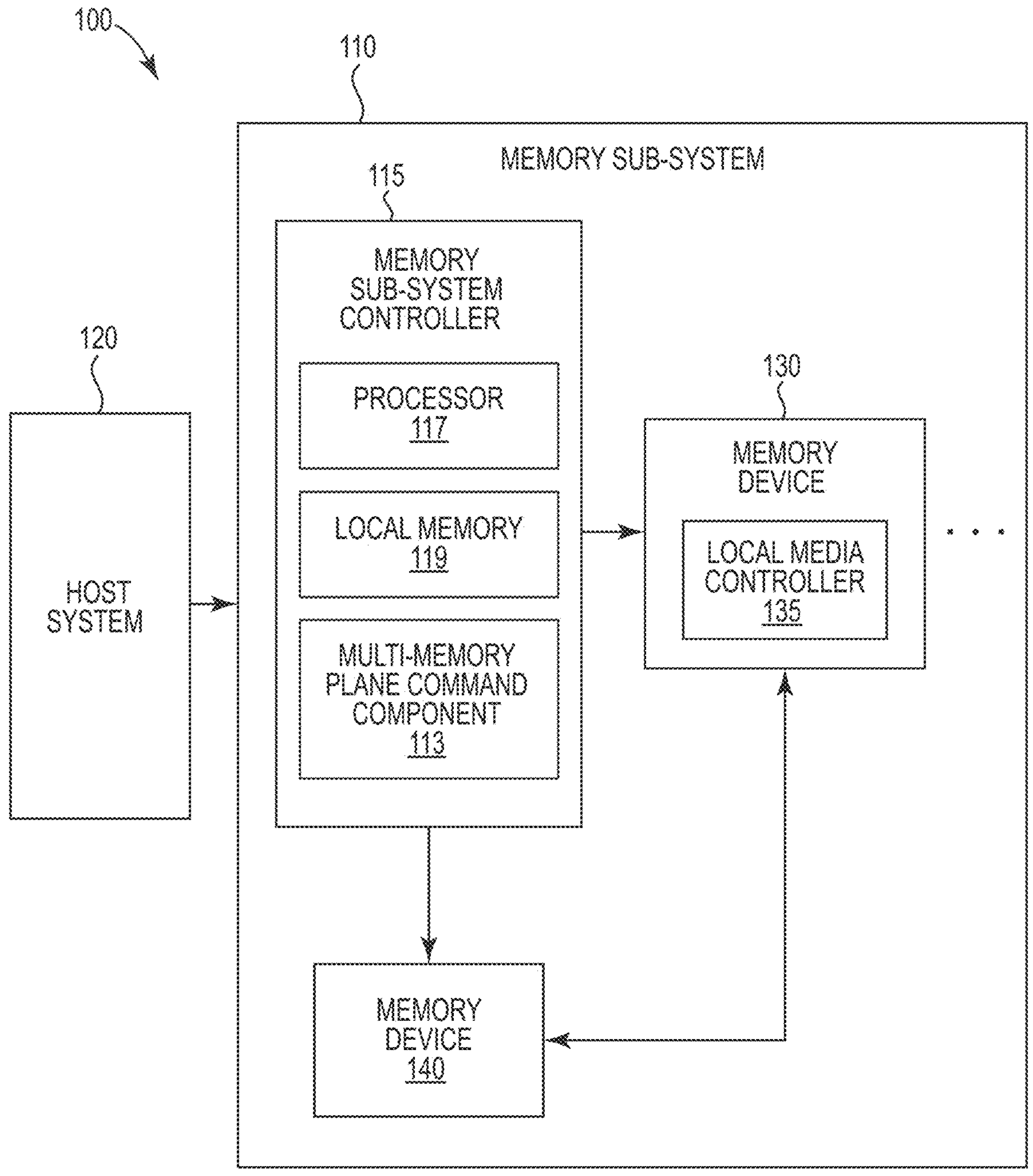
FIG. 1 illustrates an example computing system that includes a memory sub-system in accordance with some embodiments of the disclosure.

Aspects of the present disclosure are directed to providing multi-memory plane commands by a controller, in particular to memory sub-systems that include a multi-memory plane command component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). As used herein, a NAND memory device can include either a set of flash memory dice or a combination of the flash memory dice and a non-volatile memory (NVM) controller. The NVM controller can include circuitry for performing read/write operations as described herein. Other examples of non-volatile memory devices are described below in conjunction with FIG. 1. A non-volatile memory device is a package of one or more dice. Each die can consist of one or more planes (e.g., memory planes). Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area that can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

In some previous approaches, memory devices, such as NAND memory devices, can utilize circuitry to couple a plurality of memory planes to a connection interface. In some previous approaches, a controller can utilize a first command to execute a first operation of a first memory plane and utilize a second command to execute a second operation of a second memory plane. In these previous approaches, a sequential read operation of data that is stored on a first memory plane and a second memory plane can be executed utilizing a first command signal and a second command signal. As such, memory device performance can be lowered due to utilizing multiple commands to perform a sequential read operation or other type of operation across multiple memory planes.

Aspects of the present disclosure address the above and other deficiencies by employing multi-memory plane commands by a controller. For instance, the present disclosure can utilize a single command to execute an operation for a plurality of memory planes instead of utilizing a corresponding command for each operation associated with the plurality of memory planes. In this way, a quantity of time of the operation associated with the plurality of memory planes can be reduced and memory device performance can be increased. In some embodiments, a host or controller can send a single command signal to the memory device. The single command signal can include instructions to perform a sequential read operation of a first memory plane and of a second memory plane. That is, the single command signal can be employed to perform the sequential read operation of a plurality of memory planes in the absence of an additional command signal to read data from the plurality of memory planes. In this example, the controller can send a plurality of clock signals during a period of time when the memory device is switching between performing the operation from the first memory plane to the second memory plane. In response to the plurality of clock signals, the memory device can provide dummy data to the host or the controller. In this way, the quantity of commands can be reduced from a plurality of commands associated with a plurality of memory planes to a single command associated with the plurality of memory planes. Thus, the quantity of time typically utilized to generate a plurality of commands employed by previous approaches can be reduced to a quantity of time utilized to generate a single command, as described herein.

FIG. 1 illustrates an example computing system 100 that includes a memory sub-system 110 in accordance with some embodiments of the disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single-level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, a MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

As described above, the memory components can be memory dice or memory packages that form at least a portion of the memory device 130. In some embodiments, the blocks of memory cells can form one or more "superblocks." As used herein, a "superblock" generally refers to a set of data blocks that span multiple memory dice and are written in an interleaved fashion. For instance, in some embodiments each of a number of interleaved NAND blocks can be deployed across multiple memory dice that have multiple planes and/or pages associated therewith. The terms "superblock," "block," "block of memory cells," and/or "interleaved NAND blocks," as well as variants thereof, can, given the context of the disclosure, be used interchangeably.

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or a controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140. For instance, in some embodiments, the memory device 140 can be a DRAM and/or SRAM configured to operate as a cache for the memory device 130. In such instances, the memory device 130 can be a NAND.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device. The memory sub-system 110 can also include additional circuitry or components that are not illustrated.

The memory sub-system 110 can include a multi-memory plane command component 113, which may be referred to in the alternative as a "controller," herein. Although not shown in FIG. 1 so as to not obfuscate the drawings, the multi-memory plane command component 113 can include various circuitry to facilitate aspects of multi-memory plane commands, as detailed herein. In some embodiments, the multi-memory plane command component 113 can include special purpose circuitry in the form of an ASIC, FPGA, state machine, and/or other logic circuitry that can allow the multi-memory plane command component 113 to orchestrate and/or perform the operations described herein.

In some embodiments, the memory sub-system controller 115 includes at least a portion of the multi-memory plane command component 113. For example, the memory sub-system controller 115 can include a processor 117 (processing device) configured to execute instructions stored in local memory 119 for performing the operations described herein. In some embodiments, the multi-memory plane command component 113 is part of the memory sub-system 110, an application, or an operating system.

In a non-limiting example, an apparatus (e.g., the computing system 100) can include a multi-memory plane command component 113. The multi-memory plane command component 113 can be resident on the memory sub-system 110. As used herein, the term "resident on" refers to something that is physically located on a particular component. For example, the multi-memory plane command component 113 being "resident on" the memory sub-system 110 refers to a condition in which the hardware circuitry that comprises the multi-memory plane command component 113 is physically located on the memory sub-system 110. The term "resident on" can be used interchangeably with other terms such as "deployed on" or "located on," herein.

Figure 2:
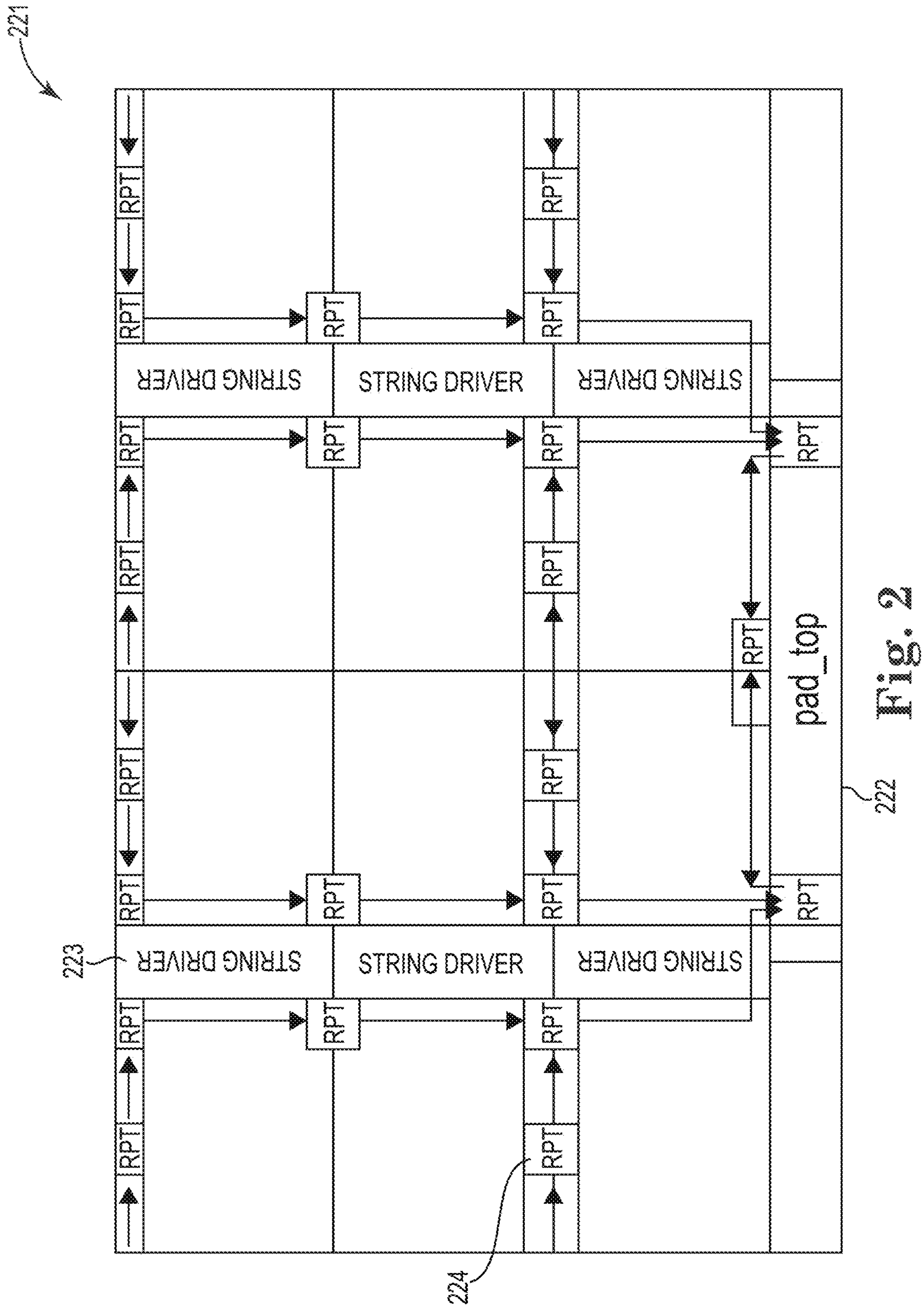
FIG. 2 illustrates a system for providing multi-memory plane commands in accordance with some embodiments of the disclosure.
Figure 3:
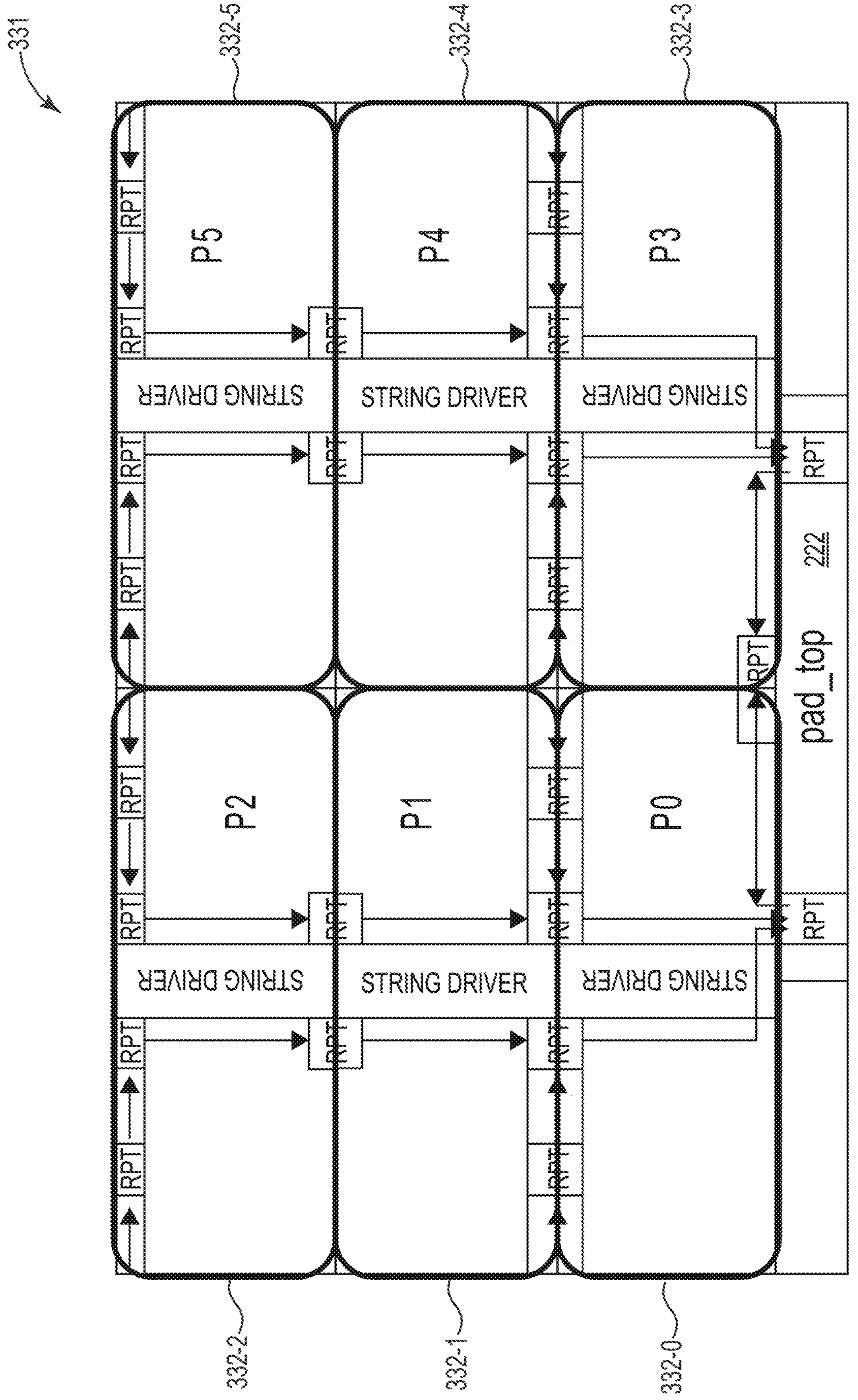
FIG. 3 illustrates a system for providing multi-memory plane commands in accordance with some embodiments of the disclosure.

As described further herein with reference to FIG. 2 and FIG. 3, the memory sub-system 110 can include circuitry that can divide a quantity of memory resources into a plurality of memory planes. As used herein, a memory plane (e.g., NAND plane, etc.) refers to a specific subset of memory cells within the memory device. A NAND flash memory chip typically contains multiple planes, each consisting of a two-dimensional array of memory cells. In some embodiments, each memory plane is essentially a separate layer within the NAND flash memory chip, with its own set of word lines and bit lines that enable data storage and access. The memory cells within a plane can be organized into blocks and pages, where a block is a group of memory cells and a page is the smallest unit of data that can be read or programmed. In some embodiments, having multiple planes in a NAND flash memory chip can increase parallelism and improve overall performance. With multiple planes, the memory controller can perform simultaneous operations on different planes, such as reading, writing, or erasing, which allows for higher data transfer rates and enhanced overall system performance.

By dividing the memory cells into planes, it becomes possible to perform operations independently on each plane, reducing access latencies and increasing overall efficiency. It also allows for more effective implementation of features like wear leveling, where erase and program operations are distributed evenly across the planes to prolong the lifespan of the NAND flash memory.

In some embodiments, each of the plurality of memory planes can include a particular quantity of memory resources (e.g., capable of storing a particular quantity of bits, etc.). In these embodiments, the circuitry can be utilized to couple the plurality of memory planes to a plurality of electrical buses that are coupled to an electrical pad. In some embodiments, the host system 120 or controller can access the plurality of memory planes through the electrical pad and/or the plurality of electrical buses. As used herein, an electrical bus or memory bus refers to a communication pathway or interface through which data is transferred between the memory subsystem and other components within a computer system. The electrical bus can act as a channel that connects memory modules or chips to the memory controller, allowing for data exchange and access.

As described herein, the plurality of memory planes can include a first memory plane that is separate and distinct from a second memory plane. In these embodiments, there can be additional memory planes. For example, the memory system can include six separate and distinct memory planes. Although examples herein describe six memory planes, additional memory planes can be utilized without departing from the present disclosure. In some embodiments, the first memory plane and the second memory plane are individually coupled to circuitry that connects the first memory plane and the second memory plane to a common bus. In some embodiments, each plane within a NAND flash memory chip operates autonomously, and the memory controller coordinates and manages the activities across all the planes to ensure proper data access and storage. In some embodiments, the first memory plane and the second memory plane are coupled sequentially such that a last cell of the first memory plane and a first cell of the second memory plane are coupled to hardware sequentially. That is, in some embodiments, the first memory plane and the second memory plane are independent memory planes coupled in series to circuitry of the memory device. Independent memory planes refer to memory planes that are not dependent upon another memory plane.

The multi-memory plane command component 113 can be configured to send a command to a memory device to perform a read operation on a first memory plane and a second memory plane. As described herein, the read operation can be a sequential read operation. As used herein, a sequential read operation includes a process of reading data from consecutive memory locations in a continuous manner. It involves retrieving data from the memory cells in a sequential order without requiring additional overhead or latency between each read operation. As described herein, the present disclosure describes how a sequential read operation can be performed across a plurality of memory planes without utilizing additional commands for each of the plurality of memory planes. During a sequential read operation, the memory controller reads data from one memory location and then automatically moves to the next adjacent location to read the subsequent data. This process continues until the desired amount of data has been retrieved or until a specific termination condition is met. In this way, the data from a last cell of the first memory plane can be read and then automatically move to a first cell location of the second memory plane.

In some embodiments, the command is a single command that identifies the first memory plane and the second memory plane for a sequential read operation. As described herein, previous sequential read operations can automatically move from a first location to an adjacent location within a particular (individual) memory plane. The present disclosure provides a sequential read operation that automatically moves from a first memory plane to a second memory plane without having an intervening command. Thus, a single command can be utilized to execute a sequential read operation that includes data from the first memory plane and the second memory plane.

In some embodiments, the command includes a switch command to switch from the first memory plane to the second memory plane without an intervening command. As used herein, the switch command can indicate that a switch from the first memory plane to the second memory plane is to be executed to allow the sequential read operation to be performed automatically. In some embodiments, the switch command can be an inherent command that can be initiated in response to a start cell location and an end cell location. For example, the start cell location within the first memory plane and the end cell location within the second memory plane can indicate that a switch command exists. In some embodiments, the command includes a sequential read of a first portion of the first memory plane and a second portion of the second memory plane. In some embodiments, the first portion includes a portion of the first memory plane. The first portion of the first memory plane may include an end portion of the first memory plane such that the second portion of the second memory plane is sequential to the first portion of the first memory plane. In this way, the sequential read operation can be performed on the first portion of the first memory plane and then automatically switch to the second memory plane to sequentially read the second portion of the second memory plane.

In some embodiments, the multi-memory plane command component 113 is configured to send the command in response to a determination that the first memory plane and the second memory plane are sequential memory planes. In some embodiments, the multi-memory plane command component 113 can determine when a sequential read operation includes data from a first memory plane and a second memory plane that are sequential memory planes. In these embodiments, the multi-memory plane command component 113 can generate a single command that includes the address locations of a first portion of the first memory plane and a second portion of the second memory plane. In this way, the single command can be utilized to execute or perform a sequential operation, such as a sequential read operation, of the first portion and the second portion without utilizing an intermediate command.

The multi-memory plane command component 113 can be configured to receive data signals corresponding to the first memory plane. In these embodiments, the multi-memory plane command component 113 can receive data signals that correspond to stored data of the first memory plane. In some embodiments, the received data signals can correspond to clock signals provided by the multi-memory plane command component 113.

The multi-memory plane command component 113 can be configured to send clock signals to the memory device upon completion of read operation of the first memory plane. In contrast to previous embodiments where a second command would be sent by a controller upon completion of the read operation of the first memory plane, the multi-memory plane command component 113 can continue to send clock signals during a transition period from the first memory plane to the second memory plane. In some embodiments, the quantity of clock signals can be determined based on a quantity of time it takes a particular memory device to switch from the first memory plane to the second memory plane. In this way, the clock signals can be provided for a time duration that corresponds to the time duration it takes to switch from providing data from the first memory plane to providing data from the second memory plane.

The multi-memory plane command component 113 can be configured to receive dummy signals from the memory device in response to the clock signals. In some embodiments, the dummy signals represent dummy data that is not associated to data stored by the first memory plane or the second memory plane. The dummy signals can be signals in response to the clock signals provided by the multi-memory plane command component 113 during the transition from the first memory plane to the second memory plane. In these embodiments, the multi-memory plane command component 113 can ignore the dummy signals or disregard the dummy signals. In some embodiments, the multi-memory plane command component 113 can identify the dummy signals since they are response signals to the clock signals that are generated by the multi-memory plane command component 113.

The multi-memory plane command component 113 can be configured to receive data signals corresponding to the second memory plane without sending an intervening command to the memory device. As described herein, the multi-memory plane command component 113 can continue to send clock signals when the memory device has switched from the first memory plane to the second memory plane. In this way, the multi-memory plane command component 113 will begin to receive data signals corresponding to the second memory plane when the memory device has completed the switch.

FIG. 2 illustrates a system 221 for providing multi-memory plane commands in accordance with some embodiments of the disclosure. The system 221 can include circuitry that can be utilized to connect a plurality of memory devices and/or memory planes to a host or host system. In some embodiments, the system 221 includes an electrical pad (pad_top) 222. In some embodiments, the electrical pad 222 can include a top-side electrical pad or electrical contact of a NAND device. The electrical pad 222 can be a physical interface through which the memory device communicates with external devices, such as a memory controller or host system.

The electrical pad 222 can serve as a connection point for transmitting electrical signals, including data, control signals, and power, between the NAND flash chip and the external circuitry. It is typically a metallic contact area located on the top surface of the NAND chip package. In some embodiments, the electrical pad 22 can be coupled to a plurality of string drivers 223. The string driver 223 can serve as an interface between the memory controller and the NAND string. In some embodiments, the string driver 223 can regulate voltage levels applied to the memory cells within the string during read, program, and erase operations. The string driver 223 ensures that the proper voltages are applied to the selected memory cells, enabling data storage, retrieval, and manipulation.

In some embodiments, the electrical pad 222 can be coupled to a plurality of repeaters (RPT) 224. In some embodiments, the plurality of repeaters 224 can be utilized to prevent signal degradation between the memory planes and the electrical pad 222. For example, a repeater can be used to compensate for signal degradation or attenuation that occurs due to long interconnect lines or high capacitive loads within the memory system. It can be a circuit element that amplifies and regenerates signals to ensure their integrity and reliability during data transfers. By compensating for signal attenuation, distortion, and timing issues, repeaters enable reliable data transfers and improve the overall performance of NAND devices. They help to maintain signal integrity, reduce data errors, and ensure that the transmitted signals can be accurately received and processed by the memory controller or host system.

FIG. 3 illustrates a system 331 for providing multi-memory plane commands in accordance with some embodiments of the disclosure. In some embodiments, the system 331 utilizes the system 221 as referenced in FIG. 2. For example, the system 331 can illustrate a plurality of memory planes 332-0, 332-1, 332-2, 332-3, 332-4, 332-4 (referred to herein as memory planes 332) that are coupled to an electrical pad 222 through a plurality of repeaters 224 and/or string drivers 223.

FIG. 3 illustrates a system that includes six memory planes 332, however a greater number of memory planes or fewer number of memory planes could be utilized without departing from the present disclosure. In some embodiments, the plurality of memory planes are numbered sequentially to identify memory planes that are connected sequentially. That is, plane 332-1 can be sequentially connected to plane 332-2. In this example, an end location or end bit of plane 332-1 can be sequentially connected to a start location or start bit of plane 332-2. In this way, the plane 332-1 can be a first plane and the plane 332-2 can be a second plane. In some embodiments, the first plane can be plane 332-0 and the second plane can be plane 332-2. In these embodiments, the sequential read operation can be performed on plane 332-0, plane 332-1, and plane 332-2.

In some embodiments, a sequential read operation can be performed using a single command signal for a plurality of sequentially connected memory planes 332. For example, a sequential read operation can be performed over plane 332-0 (P0), plane 332-1 (P1), plane 332-2 (P2), plane 332-3 (P3), plane 332-4 (P4), and plane 332-5 (P5) without having intervening command signals between the plurality of planes 332. In this way, a single command signal can be utilized to perform a sequential command over sequential memory planes of the plurality of planes 332.

Figure 4:
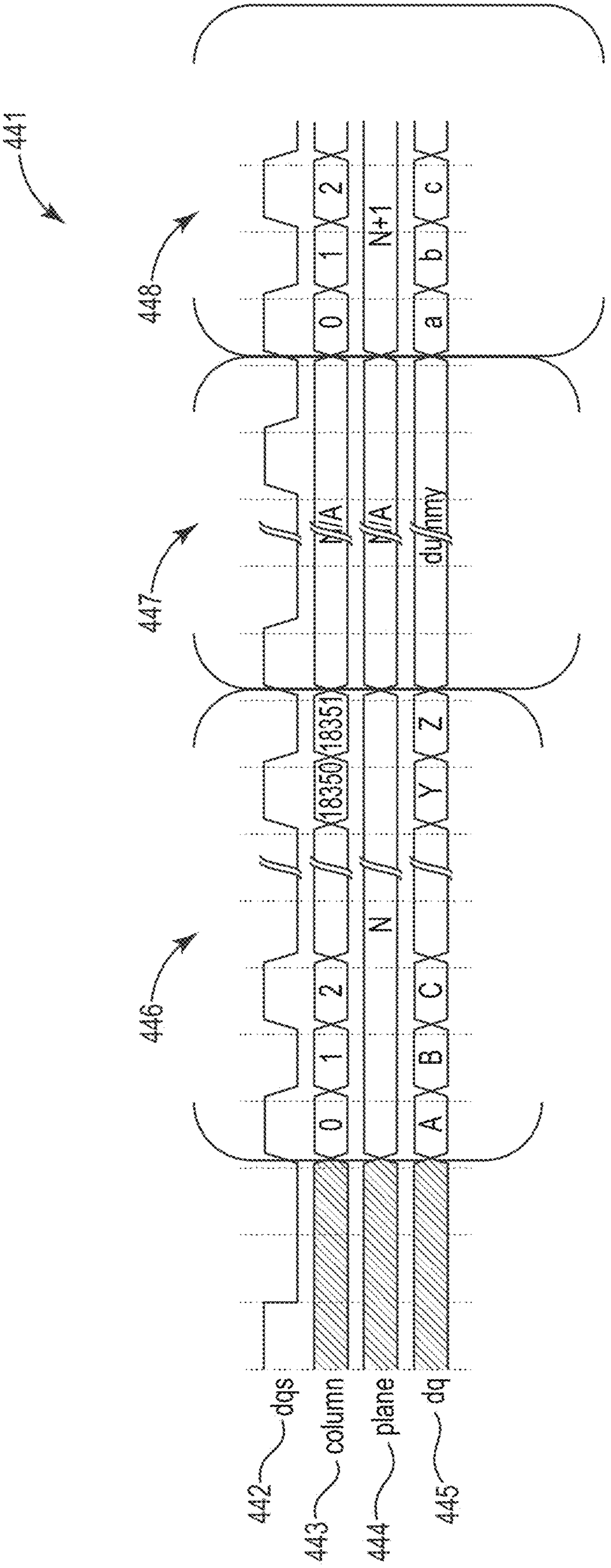
FIG. 4 illustrates a timing diagram for multi-memory plane commands in accordance with some embodiments of the disclosure.

FIG. 4 illustrates a timing diagram 441 for multi-memory plane commands in accordance with some embodiments of the disclosure. The signal timing diagram can include a clock signal (dqs) 442, a column signal 443, a plane designation signal 444, and a data signal (dq) 445. The clock signal 442 can illustrate a clock signal provided by a host or host controller. For example, the clock signal 442 can be a clock signal generated by a multi-memory plane command component 113 as referenced in FIG. 1. As illustrated in FIG. 4, the clock signal 442 can remain constant when the plane designation signal 444 is switching from a first plane (e.g., plane N) to a second plane (e.g., plane N+1).

The column signal can identify a request signal for a particular portion of the first plane that corresponds to a particular clock signal. In some embodiments, the plane can include 1851 columns that can correspond to data stored by the plane. In some embodiments, the plane designation signal 444 can represent which plane is being read by read operation. In some embodiments, the data signal 445 can represent the data provided by the memory resource in response to the column signal 443.

At 446, the timing diagram 441 illustrates when plane N is being read by a sequential read operation. In some embodiments, the column signal requests bits 0-1851 of the plane N and the data signal 445 or response is from A-Z. Thus, at 446 the timing diagram 441 illustrates the read operation for the plane N. At 447, the timing diagram illustrates a transition period when the memory device switches from the plane N to a plane N+1. As described herein, the transition period illustrated at 447 includes clock signals 442 and the response from the memory device illustrated by the data signal 445 includes dummy data that does not correspond to data stored by the memory device.

Upon completion of 447, the timing diagram 441 moves to 448. At 448, the clock signal 442 remains consistent from 447. The column signal 443 now corresponds to columns of the plane N+1 and the data signal 445 corresponds to the data a-z stored by the plane N+1. In this way, a single operation command can allow an operation to be performed on the memory device for a plane N with a transition period at 447 to allow for the operation to be performed on the memory device for a plane N+1.

Figure 5:
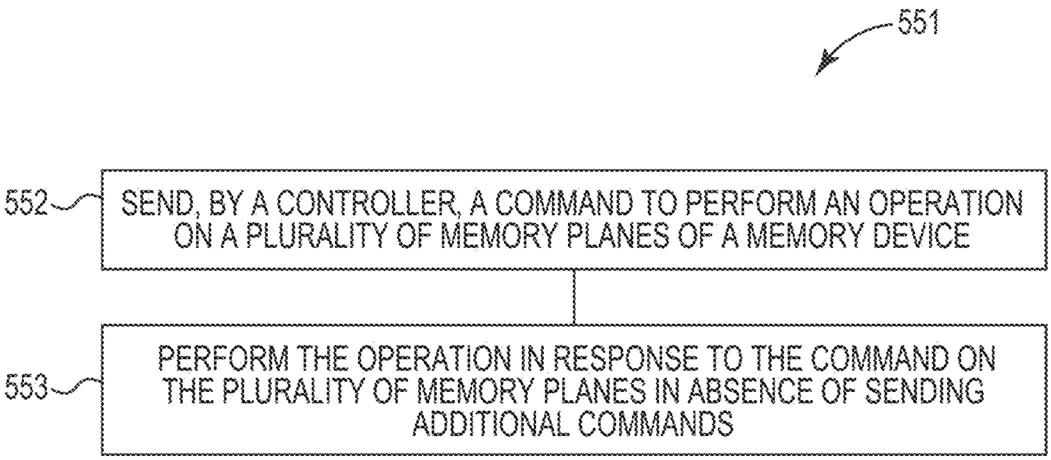
FIG. 5 illustrates a flow diagram of a method for providing multi-memory plane commands in accordance with some embodiments of the disclosure.

FIG. 5 illustrates a flow diagram of a method 551 for providing multi-memory plane commands in accordance with some embodiments of the disclosure. The method 551 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 551 is performed by the multi-memory plane command component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 552, the method 551 can be executed to send, by a controller, a command to perform an operation on a plurality of memory planes of a memory device. As described herein, the command can be an instruction or signal to execute a particular operation. In some embodiments, the command is a sequential read command of the plurality of memory planes. In these embodiments, the plurality of memory planes are sequential memory planes. For example, the command can be an instruction to execute a sequential read operation of data that is stored on the plurality of memory planes. In these embodiments, the plurality of memory planes can be sequentially connected memory planes. In this way, the command can be utilized to perform an operation on the plurality of memory planes without providing intervening commands.

At operation 553, the method 551 can be executed to perform the operation in response to the command on the plurality of memory planes in absence of sending additional commands. As used herein, absence of sending additional commands refers to not sending additional commands or not sending any intervening commands. As described herein, the operation can be a sequential read operation that is performed on the plurality of memory planes without having to send additional commands to switch from a first memory plane of the plurality of memory planes to a second memory plane of the plurality of memory planes. In some embodiments, a controller can continue to send clock signals during the switch between the plurality of memory planes. For example, the controller can send clock signals and the memory device associated with the plurality of memory planes can respond with dummy data or data that is not associated with stored data of the memory planes back to the controller during a switch between a first memory plane and a second memory plane.

That is, in some embodiments, the method 551 can be executed to send a plurality of clock signals to the memory device between performing the operation on a first memory plane of the plurality of memory planes and performing the operation on a second memory plane of the plurality of memory planes. In these embodiments, the method 551 can be executed to receive, at the controller, dummy data in response to the plurality of clock signals. In some embodiments, the plurality of clock signals are based on a quantity of time to switch between receiving data signals from the first memory plane and receiving data signals from the second memory plane. As described herein, the plurality of memory planes can be independent NAND memory planes coupled to corresponding electrical buses. In these embodiments, the corresponding electrical buses can be coupled to an electrical pad.

In other embodiments, the method 551 can be executed by a processing device of a system to identify a first memory plane and a second memory plane from a plurality of memory planes coupled to a common bus of a memory device. As described herein, the processing device or controller can identify when the first memory plane and the second memory plane are sequentially connected memory planes and/or include data that is sequentially stored by the memory planes. In this way, the address locations of the data stored by the first memory plane and second memory plane can be identified as being sequentially stored and a command identifying the sequentially stored data can be generated.

In other embodiments, the method 551 can be executed by a processing device of a system to send a command to perform a sequential read command for first memory plane and the second memory plane of the plurality of memory planes. In some embodiments, the command includes instructions to switch a communication path to the common bus from the first memory plane to the second memory plane upon completion of the read command of the first memory plane. In this way, the data provided by the memory device can automatically switch from the first memory plane to the second memory plane upon completion of the read command of the first memory plane. In some embodiments, the address location range of the command can indicate the read portion of the first memory plane and the read portion of the second memory plane as a single sequential read operation to indicate the switch from the first memory plane to the second memory plane.

In other embodiments, the method 551 can be executed by a processing device of a system to receive data signals associated with the first memory plane. As described herein, the command can be an instruction to perform a sequential read operation or other type of operation where the memory device responds with data signals. In this example, the command can be an instruction for a sequential read operation of data stored by a first memory plane and a second memory plane. In this way, the processing device of the system can receive data signals associated with the first memory plane. That is, the processing device of the system can receive data signals that corresponds to data stored by the first memory plane.

In other embodiments, the method 551 can be executed by a processing device of a system to send dummy clock signals to the memory device upon completion of the read command of the first memory plane. In some embodiments, the dummy clock signals can be clock signals that are generated by the processing device and sent to the memory device without being associated with a request for data from the memory device. As described herein, the dummy clock signals can be clock signals that are sent to the memory device during a transition period when the memory device switches from the first memory plane to the second memory plane. In some embodiments, the quantity of dummy clock signals can be calculated or determined based on a quantity of time it takes for the memory device to switch from the first memory plane to the second memory plane. In this way, the processing device can begin sending regular clock signals with data request signals from the second memory plane when the memory device has completed the switch from the first memory plane to the second memory plane.

In other embodiments, the method 551 can be executed by a processing device of a system to receive dummy signals in response to the dummy clock signals. As described herein, the dummy clock signals can be sent to the memory device and the memory device can respond to the dummy clock signals with dummy data signals or dummy signals. As used herein, the dummy signals or dummy data signals can be signals generated by the memory device that does not correspond to data stored by the memory device. In some embodiments, the dummy clock signals can be sent to the memory device and the memory device can respond with dummy signals without altering a performance of the memory device. In some embodiments, the processing device can send an instruction to the memory device to ignore the dummy clock signals. For example, the processing device can send an instruction to notify the memory device that the dummy clock signals are not associated with a data request from the memory device. In these embodiments, the processing device can ignore the dummy data or dummy signals received from the memory device.

In other embodiments, the method 551 can be executed by a processing device of a system to receive data signals associated with the second memory plane upon completion of receiving dummy signals. As described herein, the processing device can receive data signals associated with the second memory plane when the memory device switches from the first memory plane to the second memory plane. In this way, the processing device can determine when the dummy clock signals have completed and when the data signals associated with the second memory plane are being received. For example, the processing device can determine that the dummy clock signals have completed when a particular quantity of dummy clock signals have been sent. As described herein, a particular quantity of dummy clock signals can be sent to allow the memory device to switch from a first memory plane to a second memory plane.

Figure 6:
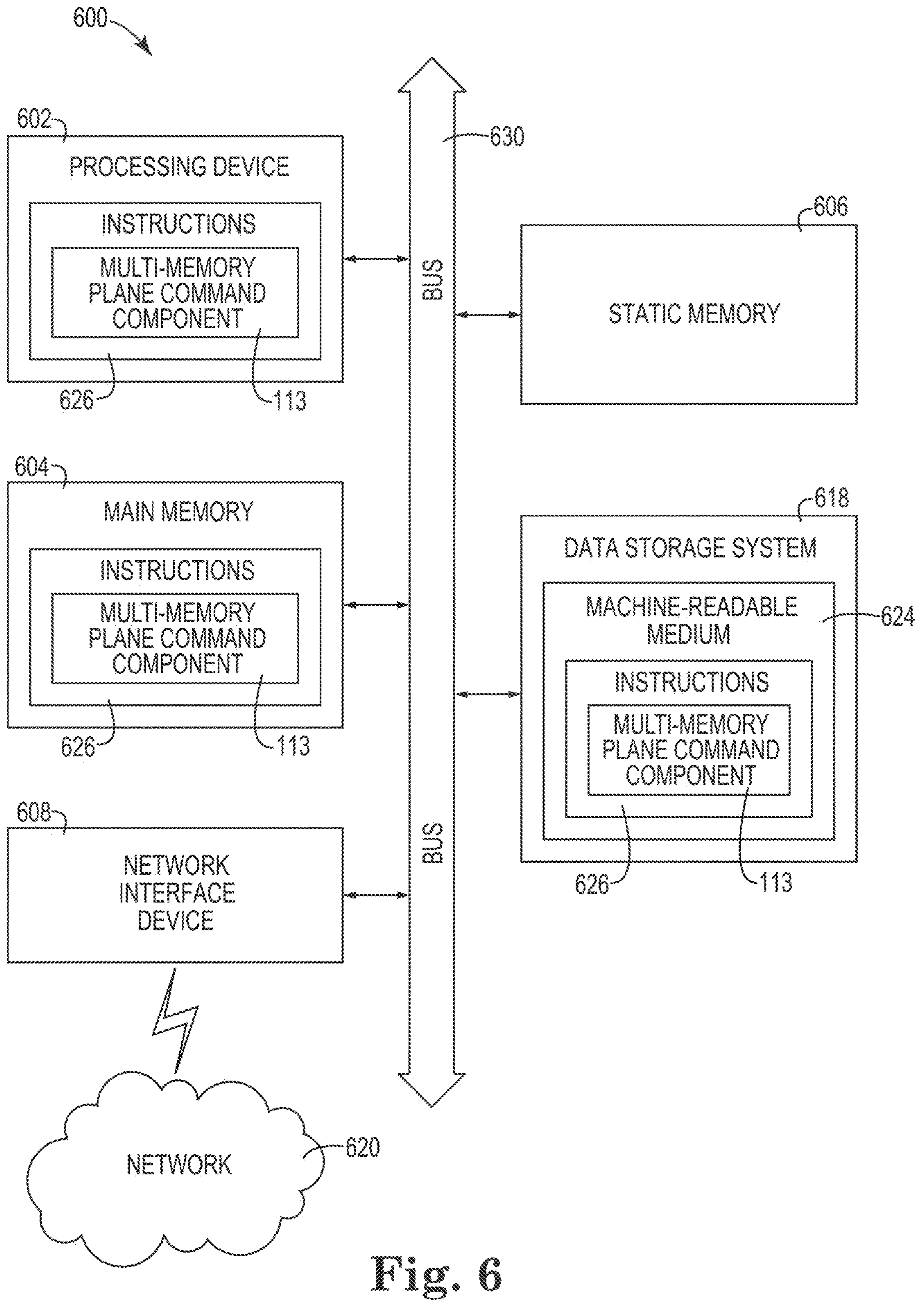
FIG. 6 is a block diagram of an example computer system in which embodiments of the disclosure may operate.

FIG. 6 is a block diagram of an example computer system in which embodiments of the disclosure may operate. For example, FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the multi-memory plane command component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a multi-memory plane command component (e.g., the multi-memory plane command component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer).

In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

sending, by a controller, a command to perform an operation on a plurality of memory planes of a memory device;

performing the operation in response to the command on the plurality of memory planes in absence of sending additional commands; and sending a plurality of clock signals to the memory device between performing the operation on a first memory plane of the plurality of memory planes and performing the operation on a second memory plane of the plurality of memory planes.

2. The method of claim 1, further comprising receiving, at the controller, dummy data in response to the plurality of clock signals.

3. The method of claim 1, wherein the plurality of clock signals are based on a quantity of time to switch between receiving data signals from the first memory plane and receiving data signals from the second memory plane.

4. The method of claim 1, wherein the plurality of memory planes are independent NAND memory planes coupled to corresponding electrical buses.

5. The method of claim 4, wherein the corresponding electrical buses are coupled to an electrical pad.

6. The method of claim 1, wherein the command is a sequential read command of the plurality of memory planes.

7. The method of claim 6, wherein the plurality of memory planes are sequential memory planes.

8. An apparatus, comprising:

a controller configured to:

send a command to a memory device to perform a read operation on a first memory plane and a second memory plane;

receive data signals corresponding to the first memory plane;

send clock signals to the memory device upon completion of read operation of the first memory plane;

receive dummy signals from the memory device in response to the clock signals; and receive data signals corresponding to the second memory plane without sending an intervening command to the memory device.

9. The apparatus of claim 8, wherein the first memory plane and the second memory plane are independent memory planes coupled in sequence to circuitry of the memory device.

10. The apparatus of claim 8, wherein the dummy signals represent dummy data that is not associated to data stored by the first memory plane or the second memory plane.

11. The apparatus of claim 8, wherein the controller is further configured to send the command in response to determining that the first memory plane and the second memory plane are sequential memory planes.

12. The apparatus of claim 8, wherein the command is a single command that identifies the first memory plane and the second memory plane for a sequential read operation.

13. The apparatus of claim 8, wherein the command includes a switch command to switch from the first memory plane to the second memory plane without an intervening command.

14. The apparatus of claim 8, wherein the command includes a sequential read of a first portion of the first memory plane and a second portion of the second memory plane.

15. The apparatus of claim 8, wherein the first memory plane and the second memory plane are individually coupled to circuitry that connects the first memory plane and the second memory plane to a common bus.

16. A system comprising:

a memory sub-system comprising a non-volatile memory device; and a processing device coupled to the memory sub-system, wherein the processing device is configured to:

identify a first memory plane and a second memory plane from a plurality of memory planes coupled to a common bus of a memory device;

send a command to perform a sequential read command for first memory plane and the second memory plane of the plurality of memory planes;

receive data signals associated with the first memory plane;

send dummy clock signals to the memory device upon completion of the command of the first memory plane;

receive dummy signals in response to the dummy clock signals; and receive data signals associated with the second memory plane upon completion of receiving dummy signals.

17. The system of claim 16, wherein the processing device is further configured to send an instruction to the memory device to ignore the dummy clock signals.

18. The system of claim 16, wherein the processing device is further configured to ignore the dummy signals.

19. The system of claim 16, wherein the command includes instructions to switch a communication path to the common bus from the first memory plane to the second memory plane upon completion of the sequential read command of the first memory plane.

* * * * *